(12) United States Patent
Fetzer et al.

(10) Patent No.: US 9,012,049 B2
(45) Date of Patent: Apr. 21, 2015

(54) METHOD AND DEVICE FOR APPLICATION OF A PRESSURE TO A BATTERY

(75) Inventors: Joachim Fetzer, Bad-Ditzenbach (DE); Stephan Leuthner, Leonberg (DE); Holger Fink, Stuttgart (DE)

(73) Assignee: Robert Bosch GmbH, Stuttgart, DE (US)

( * ) Notice: Subject to any disclaimer, the term of this patent is extended or adjusted under 35 U.S.C. 154(b) by 251 days.

(21) Appl. No.: 13/392,085

(22) PCT Filed: Jul. 8, 2010

(86) PCT No.: PCT/EP2010/059842
§ 371 (c)(1),
(2), (4) Date: Apr. 11, 2012

(87) PCT Pub. No.: WO2011/023445
PCT Pub. Date: Mar. 3, 2011

(65) Prior Publication Data
US 2012/0189879 A1    Jul. 26, 2012

(30) Foreign Application Priority Data
Aug. 28, 2009  (DE) .................. 10 2009 028 986

(51) Int. Cl.
| H01M 10/44 | (2006.01) |
| H01M 2/00 | (2006.01) |
| H01M 10/42 | (2006.01) |
| H01M 10/0525 | (2010.01) |
| H01M 10/48 | (2006.01) |

(52) U.S. Cl.
CPC .......... *H01M 10/42* (2013.01); *H01M 10/0525* (2013.01); *H01M 10/48* (2013.01); *Y02E 60/122* (2013.01)

(58) Field of Classification Search
USPC ...................................... 429/50, 61
See application file for complete search history.

(56) References Cited

U.S. PATENT DOCUMENTS

2005/0089750 A1* 4/2005 Ng et al. ............... 429/120
2006/0246345 A1* 11/2006 Yoon et al. ............. 429/62

FOREIGN PATENT DOCUMENTS

| DE | 31 51 469 A1 | 7/1983 |
| DE | 42 18 381 C1 | 5/1993 |
| EP | 1 928 050 A1 | 6/2008 |
| WO | 97/30486 A1 | 8/1997 |
| WO | 99/05746 A1 | 2/1999 |
| WO | 03/071616 A2 | 8/2003 |
| WO | 2006/112639 A1 | 10/2006 |

OTHER PUBLICATIONS

International Search Report corresponding to PCT Application No. PCT/EP2010/059842, mailed Sep. 30, 2010 (German and English language document) (7 pages).

* cited by examiner

*Primary Examiner* — Muhammad Siddiquee
(74) *Attorney, Agent, or Firm* — Maginot, Moore & Beck LLP

(57) ABSTRACT

A method and device is disclosed for application of a pressure to a battery which has at least one or more cells, in order to reduce adverse effects on operation which occur because of different battery states of charge. The device is designed to carry out the method such that the pressure is adjusted as a function of the respective battery volume and/or of the respective battery state of charge.

6 Claims, 3 Drawing Sheets

METHOD AND DEVICE FOR APPLICATION OF A PRESSURE TO A BATTERY

This application is a 35 U.S.C. §371 National Stage Application of PCT/EP2010/059842, filed on Jul. 8, 2010, which claims the benefit of priority to Serial No. DE 10 2009 028 986.0, filed on Aug. 28, 2009 in Germany, the disclosures of which are incorporated herein by reference in their entirety.

BACKGROUND

The present disclosure relates to a method and to a device for application of a pressure to a battery, which comprises at least one or more cells, in order to reduce adverse effects on operation which occur because of different states of battery charge.

Batteries for storing electrical energy, especially lithium ion batteries, expand as they are charged and contract again as they are discharged. These changes in volume and length are caused by the absorption and release processes of lithium ions in the active materials of the electrodes. The absorption of lithium into the carbon material causes the material to expand. This increase in volume is transmitted outward via the case of the battery cell, provided the cell has a corresponding capacity for expansion, and thus leads to a change in at least one geometric dimension of the battery; especially in situations in which the battery comprises a plurality of cells.

Where the battery is embodied with a substantially rigid housing, the expansion of the carbon material causes a buildup of the pressure-induced stress in the respective battery cell. This can have the effect of exposing the individual layers arranged in the cell (metal layer, cathode material, separator, anode material, film where applicable) to mechanical stresses due to the expansion and contraction of the electrode materials. The result is a rise in the electrical resistance in the battery and hence reduced performance.

One known way of preventing the mechanical stress described is to apply a constant contact pressure, as illustrated in FIG. 1. FIG. 1 shows a battery 10 having a plurality of cells 11, the cells 11 being arranged in a pack or a stack. Constant pressure forces 16 are introduced into the cells 11 by means of flanges 12 arranged above and below the pack of cells. This results in reaction forces 17 prevailing between the cells. The constant contact pressure is intended to prevent the unwanted separation of individual layers from the electrode materials. Such a constant contact pressure is employed, in particular, in battery cells for hybrid vehicles. These cells are generally operated at a state of charge (SOC) of, on average, 30 to 70%, generally 50%. The lithium ion batteries provided for electric vehicles are operated at states of charge of from 0 to 100%. Batteries for electric vehicles are also of similar construction to those for hybrid vehicles.

Since the volume increases at higher states of charge, and the volume decreases at smaller states of charge, the battery cells of a battery for an electric vehicle are in some cases subjected to considerable expansions in volume and contractions in volume. This results from continuously alternating stresses due to discharges during acceleration of the vehicle and when charging during recuperative operation of the brakes.

However, especially in the case of more pronounced increases in volume and reductions in volume of the active materials within the cell, pressing the battery cells together firmly at a constant pressure (without a change in length of the stack of cells) may result in the separator being overcompressed, and this likewise results in an increase in the internal electrical resistance of the battery cell. In addition, anode material and possibly also cathode material may be elastically or plastically deformed, and this likewise leads to a rise in the internal electrical resistance.

Further mechanical stresses on a battery or a battery cell can arise, for example, from an increase in temperature within the cell and the resulting evaporation of electrolytes contained therein, the vapor leading to a further rise in pressure within the cell. Especially at elevated temperatures, chemical reactions in the battery or in a cell can furthermore occur, giving rise to gases which generate an additional rise in pressure within the battery cell.

These stresses are all the higher, the greater the fluctuations in the state of charge during the operation of the battery.

In the case of conventional batteries and especially lithium ion batteries, it is thus difficult, on the one hand, to avoid the mechanical stresses which can lead to damage to layers within a battery cell and, on the other hand, to ensure that the internal resistance in the battery or in a battery cell is not increased over its time in service.

WO 2006/112639A1 has disclosed the arrangement of piezoelectric sensors for detecting the internal pressure within a battery. By detecting when a particular predetermined internal pressure is exceeded, it is possible to initiate suitable countermeasures. However, it does not disclose what countermeasures are suitable.

It is therefore the underlying object of the disclosure to provide a method and a device by means of which premature battery wear or a premature battery aging process can be prevented and a sufficiently low internal resistance can be ensured in a simple manner.

The present object is achieved by the method as and by the device as set forth below.

Advantageous embodiments of the method are described below, and advantageous embodiments of the device according to the disclosure are also described below.

As a supplementary measure, a motor vehicle which has the device according to the disclosure is furthermore provided in accordance with the disclosure as set forth below.

SUMMARY

To achieve the object, a method for application of a pressure to a battery is provided, wherein the battery comprises at least one or more cells, in order to achieve reductions in adverse effects on operation which occur because of different states of battery charge. According to the disclosure, the pressure is adjusted as a function of the respective battery volume and/or of the respective state of battery charge. This means that the pressure is applied to an individual cell or, in the case where a plurality of cells is arranged in the battery, to a pack of cells. In the case of a battery with just one cell, the battery volume is thus simultaneously essentially the cell volume, and the state of battery charge is essentially the state of charge of the cell. In this context, the state of charge refers to the respective value of the charge stored in the battery. At a high charge, the cell or battery has a large volume and, at a low charge, it has a small volume. The pressure on the battery is adjusted to match the respective charge value and/or the respective volume. This means that the output variable for adjustment of the pressure is the volume or a representative measure of the volume, e.g. the length and/or charge value of the battery. By means of this measure of the variable adjustment of the pressure as a function of the volume and/or the charge of the battery, it is possible to achieve a significant increase in the cycle life thereof.

In particular, provision is made for the pressure to be reduced when the battery volume increases, and for the pressure to be increased when the battery volume decreases.

As an alternative or supplementary measure, provision is made for the pressure to be reduced when the state of charge of the battery increases, and for the pressure to be increased when the state of charge of the battery decreases. This means, for example, that, relative to a state of charge and a volume with a battery at a charge of 50%, the pressure is reduced when there is an increase in the charge to 60% and a corresponding increase in volume, and that the pressure is correspondingly increased when the charge is, for example, 30%, and there is an associated reduction in volume. From this, it is apparent that simple compression springs cannot be used to exert the external pressure on the battery or the cells because they would be compressed in the event of an increase in volume and the associated increase in length and would consequently bring about higher pressure forces on the battery. According to the disclosure, however, precisely the opposite is provided, namely that lower pressure forces are applied when there is an increase in volume. The preferred option here is that, starting from a charge of 50%, the pressure force is increased by 5-50% in each case, depending on the state of charge, when there is a respective increase in the charge by 10%.

The method can be embodied in such a way that, when there is a plurality of cells per battery, the pressure is directed at the pack of cells from the outside and/or is generated between the cells. In the case of a plurality of cells per battery, it is advantageous if the pressure is applied to all the cells from the outside, with the pressure force being transmitted from one cell to the respectively adjacent cell by virtue of the fact that the cells are placed against one another. As an alternative or supplementary measure, however, it is also possible to provide for actuators to be arranged between the cells, said actuators imposing pressure forces on the cells, with the result that the cells are pushed apart and the respective outer cells of the pack of cells come to rest against limit elements, with the result that the pressure increase starts from the interior of the pack of cells and reaction forces are in turn introduced into the outer cells by the limit elements.

Provision can be made for the pressure to be applied to the cell or pack of cells by means of at least one pneumatically or hydraulically or mechanically operated pressure generating means. The mechanical embodiment should preferably be electromechanical, having an electric motor and a spindle for example, the latter being arranged in series with a compression spring if appropriate. Another possibility is to use a mechanical-hydraulic pressure generating device, which has a piston-cylinder unit and a pump, for example. It is furthermore possible to use a mechanical-pneumatic pressure generating device, which comprises a compressor and a gas reservoir, for example. It is advantageous to connect the pneumatic, hydraulic or mechanically operated pressure generating devices mentioned to a control unit, which performs open-loop or closed-loop control of the setting of the respective pressure value required as a function of the state of battery charge and/or of the battery volume.

In a special embodiment, provision is made for the pressure to be generated by means of at least one pressure generating means based on the piezoelectric effect. The piezoelectric pressure generating means can be arranged on the outer wall of a cell positioned in a pack of cells and can thus be arranged in the pack itself, or the piezoelectric pressure generating means is arranged on only one or both outer cells of the pack of cells and thus supplies pressure force to the pack of cells from the outside.

When the piezoelectric pressure generating means is used, the method according to the disclosure is advantageously embodied especially if the piezoelectric pressure generating means is furthermore used to determine the state of charge of the battery. This means that when there is a change in at least the length, the width or the height of the battery owing to different states of charge, a voltage is generated in the piezoelectric element owing to the deformation thereof, and it is possible to derive from the value of said voltage a measure of a deformation of the battery acting on the piezoelectric element.

When there is a change in the volume of the battery and an associated change in the dimensions of the battery, it is thus possible to achieve a change in the shape of piezoelectric elements fixed in the vicinity of the battery and hence to detect or measure the change in the volume of the battery or of the cell or cells contained therein. Conversely, the change in the shape of the piezoelectric pressure generating means can in turn be achieved by applying a sufficient voltage and it is thus possible to vary the pressure force applied to the battery by the piezoelectric pressure generating means.

The piezoelectric pressure generating means and the piezoelectric elements can be the same components.

A device for application of a pressure to a battery, which comprises at least one or more cells, is furthermore provided according to the disclosure in order to achieve the reduction of adverse effects on operation which occur because of different states of battery charge. According to the disclosure, the device is embodied in such a way that a pressure can be applied to or is applied to the battery by said device as a function of the respective battery volume and/or of the respective state of battery charge. This device is thus suitable especially for carrying out the method according to the disclosure. When the battery is embodied with just one cell, the pressure force is exerted on just this one cell by the device. If the battery has a plurality of cells, the pressure force is exerted at least on one but preferably on all the cells of the pack of cells of the battery. The device should comprise an open-loop control unit and/or a closed-loop control unit, by means of which signals for adjusting the respective pressure can be generated according to the battery volume and/or state of battery charge detected.

It is advantageous if the device according to the disclosure is embodied in such a way that the pressure can be reduced or is reduced by the action of said device on the battery when the battery volume increases, and the pressure can be increased or is increased by the action of said device when the battery volume decreases, and/or the pressure can be reduced or is reduced by the action of said device when the state of charge increases, and the pressure can be increased or is increased by the action of said device when the state of charge decreases. For this purpose, it is advantageous if the device according to the disclosure comprises at least one pneumatically or hydraulically or mechanically acting pressure generating device. These pressure generating devices should advantageously be designed for electromechanical or mechanical-hydraulic or mechanical-pneumatic operation, as explained in the description of the method.

In a special embodiment, the device comprises at least one pressure generating means based on the piezoelectric effect, by means of which the pressure on the battery can be generated or is generated by changing the voltage applied across the piezoelectric pressure generating means. This piezoelectric pressure generating means can also be used to determine the state of charge of the battery on the basis of the associated change in the volume of the battery and the change in the shape of the piezoelectric element which this entails. In this embodiment too, the device should comprise a processing unit, by means of which the signal generated by the piezoelectric pressure generating means can be converted into information on the state of charge of the battery.

The device can furthermore have a measuring and/or detection device, by means of which the mechanical stress owing to connected cooling devices, the temperature in the interior of the battery, the pressure within the battery and/or the composition of the gases in the battery, for example, can be detected, measured and analyzed. The mechanical stress brought about by the connected cooling device should be offset against the pressure to be set. In particular, measurement of the temperature should be used for the mathematical determination of vapor formation within the battery from electrolytes contained therein since pressure generated in the battery has an effect on the internal pressure in the battery. Analysis of the gases which may be formed owing to chemical reactions can likewise be used to determine the internal pressure in the battery. For this purpose, the device should comprise a processing unit which is suitable for converting the measured and/or analytical values into values relating to the prevailing internal pressure conditions and for feeding them to a control unit which offsets the theoretical, calculated pressure values against the pressure values that are to be set owing to the change in volume and/or the change in the state of charge.

As a supplementary measure to the disclosure, a motor vehicle, in particular a motor car, is furthermore provided, said vehicle comprising at least one battery, in particular a lithium ion battery, and furthermore comprising a pressure application device according to the disclosure, which acts on the battery in a manner in accordance with the disclosure. In particular, a motor vehicle of this kind can be a hybrid vehicle or electric vehicle e.g. an electric bike. In addition, however, the method according to the disclosure and the device according to the disclosure can also be used for stationary batteries with a high charging stroke and demanding requirements as regards the charging cycles, such as those provided for electric power tools, inter alia.

BRIEF DESCRIPTION OF THE DRAWINGS

The present disclosure is explained below with reference to the attached drawings, in which.

DETAILED DESCRIPTION

Figure 1:
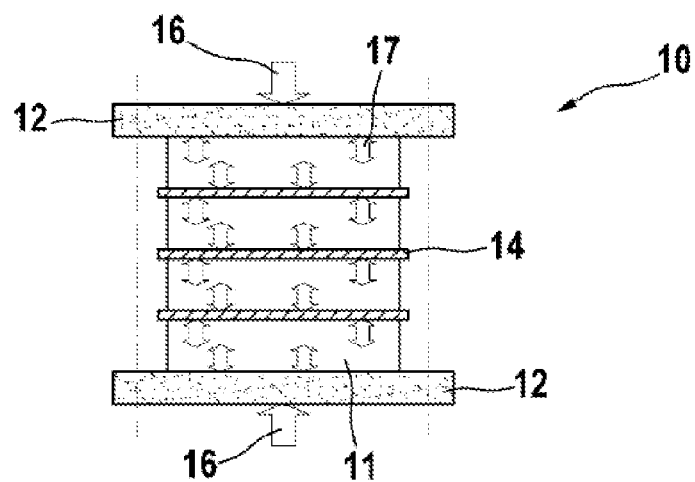
FIG. 1: shows a battery having a plurality of cells with conventional, constant pressure loading in accordance with the prior art.

Reference has already been made to FIG. 1 to explain the prior art.

Figure 2:
FIG. 2: shows an individual battery cell.

FIG. 2 shows an individual battery cell 11, which forms the energy accumulator of a battery individually or in combination with additional cells. When pressure forces 16 are applied, reaction forces 17 arise at the cell 11 when it is in contact with the flange 12 or with another cell 11. This illustrates the fact that, when a pressure force 16 is introduced into the cell, the cell transmits the pressure force introduced into it to the adjacent cell, and on the other hand is subject to the counter pressure force of the adjacent cell.

Figure 3:
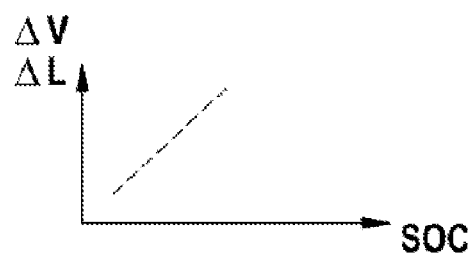
FIG. 3: shows a diagram intended to illustrate the change in volume or length as a function of the state of charge.

FIG. 3 shows the relationship between the change in volume and change in length of a battery and the state of charge (SOC). The state of charge SOC is plotted on the abscissa, and the change in volume $\Delta V$ and change in length $\Delta L$ are plotted on the ordinate. It is apparent that the volume is increased when the state of charge SOC increases. If the width dimension and height dimension of the battery are substantially maintained, the length of the battery is increased.

Figure 4:
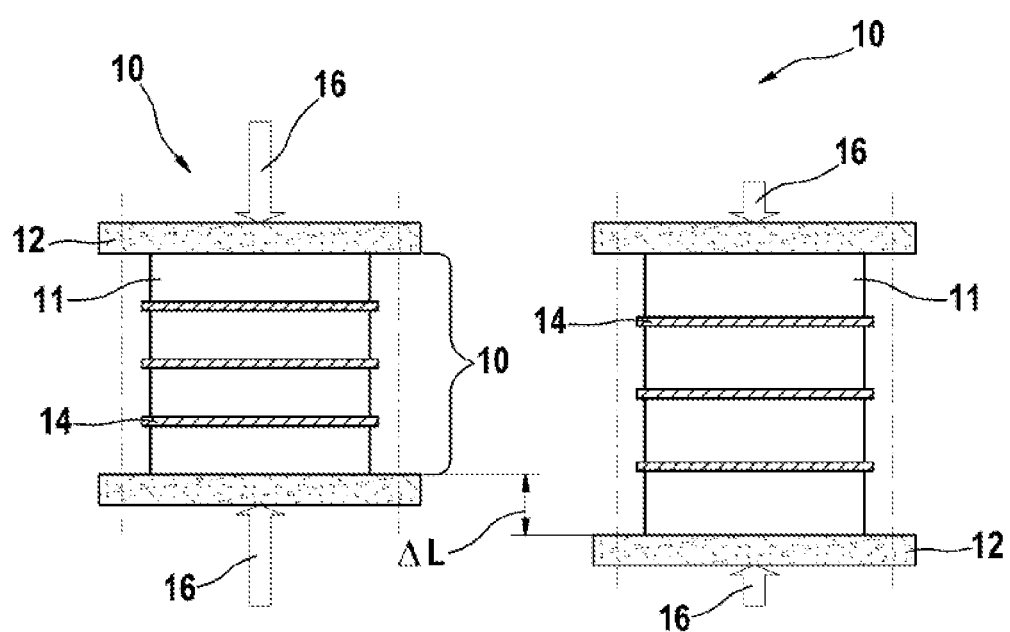
FIG. 4: shows the expansion behavior of a battery.

In FIG. 4, it is apparent how the relative change in length $\Delta L$ adjusts when there is a change in the state of charge of the battery. On the left hand side, the battery is shown in a state of charge which is lower than the battery 10 shown on the right hand side. It is apparent that the battery 10 performs a relative change in length $\Delta L$, at least if the width and height dimensions are maintained, even though it is subject to oppositely directed pressure forces 16 at flanges 12 that rest at both ends against the pack of cells formed by the cells 11. In the worst case, the relative change in length $\Delta L$ can lead to mechanical stress on individual layers, e.g. between a cell 11 and a cooling plate 14 in contact therewith, when constant forces are introduced, as already described in relation to the prior art. According to the disclosure, the pressure forces 16 are therefore reduced in the battery 10 of enlarged volume shown on the right hand side in FIG. 4, as illustrated by the pressure force arrows 16 of different lengths in FIG. 4.

Figure 5:
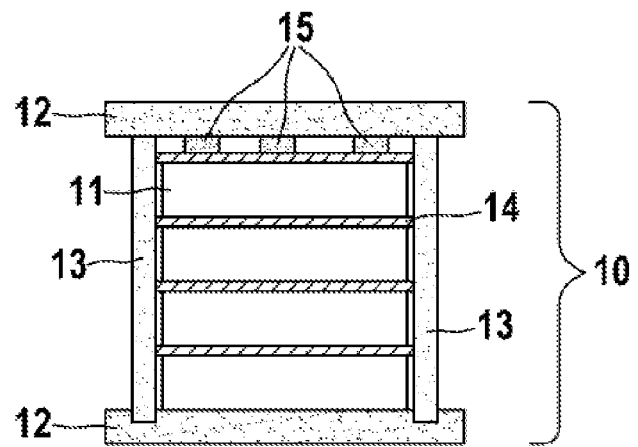
FIG. 5: shows a battery having a plurality of cells and piezoelectric pressure generating means arranged at one end.

FIG. 5 shows the situation in which a stack of battery cells 11 is accommodated between two flanges 12 and laterally arranged side walls 13. The battery is formed by the cells 11 and the cooling plates 14 arranged therebetween. The flanges 12 and the side walls 13 are part of the device according to the disclosure, by means of which the pressure on the battery from the outside can be achieved and adjusted. This means that, in this design configuration, the battery or stack of cells cannot perform any significant change in volume or length. Piezoelectric pressure generating means 15 are arranged at one end of the stack of cells. A different voltage in each case can be applied across the piezoelectric pressure generating means 15, depending on the determined value for the state of charge of the battery or of the individual cells 11, with the result that said pressure generating means exert different pressure forces on the stack of cells 11. If appropriate, force-converting devices, e.g. levers or other mechanism elements, can be arranged between the piezoelectric pressure generating means 15 and the stack of cells in order to transmit the forces.

The advantage of the present disclosure consists, in particular, in the fact that the life of batteries, especially lithium ion batteries, can be significantly increased by means of the method according to the disclosure and of the device according to the disclosure. By coupling the operation of the piezoelectric elements, it is possible at the same time to influence the external or internal pressure imposed upon the battery and, simultaneously or with a slight delay, to determine states of aging and/or states of charge by way of the deformation of the respective piezoelectric element brought about by the battery.

Figure 6:
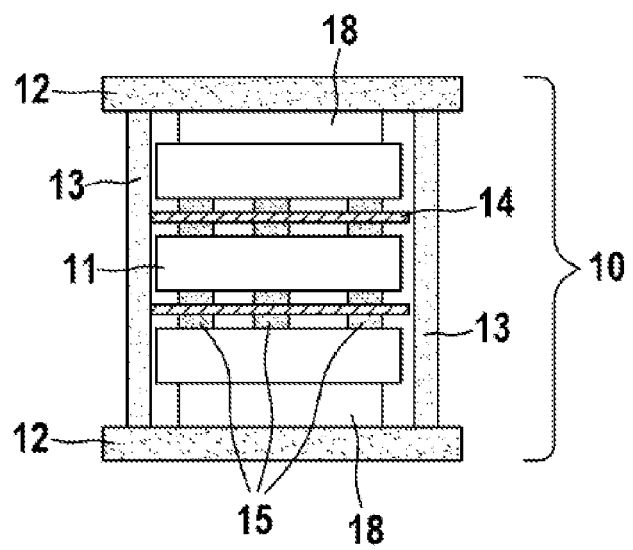
FIG. 6: shows a battery having a plurality of cells and piezoelectric pressure generating means arranged therebetween.

In FIG. 6, the stack of cells 11 is likewise surrounded by two flanges 12 and side walls 13, but these are dimensioned in such a way that the stack of cells 11 can expand between the flanges 12. In this embodiment, piezoelectric pressure generating means 15 are arranged on both sides of the cooling plates 14 arranged between the cells 11. If a sufficient voltage is applied across the piezoelectric pressure generating means 15, these can bring about the displacement of the cells 11.

Through contact between the outer cells 11 of the stack of cells and pressure application elements 18, it is thus possible to generate pressure forces on the individual cells 11. However, the disclosure is not limited to the design configuration shown in FIGS. 5 and 6; on the contrary, provision can be made for the piezoelectric pressure generating means 15 to be arranged both on the outer cells 11 of a stack of cells and between said cells 11. If appropriate, piezoelectric pressure generating means 15 are embodied in such a way that the piezoelectric pressure generating means 15 can decrease in length in the case of increased pressure forces at the outer cells 11 occurring as a result of an increase in volume, resulting in a reduction in the distance between the cells 11 and thus a reduction in the overall pressure imposed on the cells 11. This embodiment can likewise be implemented in the form shown in FIG. 5.

The piezoelectric elements or pressure generating means should preferably act on a battery which is already slightly prestressed. A preferred prestress is between 0.04 and 0.4 N/mm$^2$.

The invention claimed is:

1. A method for reducing adverse effects on operation of a battery with at least one cell due to different states of battery charge, the method comprising:
   actuating at least one pressure-generating mechanism to apply pressure to the battery, the actuation of the at least one pressure-generating mechanism being based on the piezoelectric effect; and
   adjusting the pressure as a function of a battery volume of the battery and the respective state of battery charge.

2. The method as claimed in claim 1, wherein adjusting the pressure includes reducing the pressure when the battery volume increases, and increasing the pressure when the battery volume decreases.

3. The method as claimed in claim 1, wherein, when the battery includes a plurality of cells, the pressure is one or more of applied to an outside of the cells and applied between the cells.

4. The method as claimed in claim 1, further comprising determining the state of charge of the battery with the at least one pressure-generating mechanism.

5. The method as claimed in claim 1, wherein, when the battery includes a plurality of cells, the pressure is applied directly to only an outermost cell of the plurality of cells.

6. The method as claimed in claim 1, wherein the battery includes a plurality of cells that forms a stack of cells, wherein at least one rigid cooling plate is disposed between adjacent cells of the stack of cells, and wherein the at least one pressure-generating mechanism includes a first pressure-generating mechanism disposed on one side of the cooling plate and a second pressure-generating mechanism disposed on the other side of the cooling plate.

* * * * *